United States Patent
Anand et al.

(10) Patent No.: US 8,515,211 B2
(45) Date of Patent: Aug. 20, 2013

(54) METHODS, APPARATUSES, AND COMPUTER PROGRAM PRODUCTS FOR MAINTAINING OF SECURITY AND INTEGRITY OF IMAGE DATA

(75) Inventors: Manish Anand, Ranchi (IN); Miika Juhani Vahtola, Oulu (FI)

(73) Assignee: Nokia Corporation, Espoo (FI)

( * ) Notice: Subject to any disclaimer, the term of this patent is extended or adjusted under 35 U.S.C. 154(b) by 924 days.

(21) Appl. No.: 12/339,518

(22) Filed: Dec. 19, 2008

(65) Prior Publication Data

US 2010/0158374 A1   Jun. 24, 2010

(51) Int. Cl.
*G06K 9/54* (2006.01)

(52) U.S. Cl.
USPC ........................................ 382/305

(58) Field of Classification Search
USPC .............. 345/169, 421, 520, 531, 532, 563, 345/626; 382/283, 305; 455/560; 700/129; 707/687, 694, 702, 757, 783, 785, 999.009; 711/E12.097; 712/5, 224, 247; 715/218
See application file for complete search history.

(56) References Cited

U.S. PATENT DOCUMENTS

| | | | |
|---|---|---|---|
| 5,235,681 A | | 8/1993 | Masuzaki et al. |
| 6,618,730 B1 * | | 9/2003 | Poulter et al. ............... 705/7.27 |
| 2004/0123131 A1 * | 6/2004 | Zacks et al. ................... 713/200 |
| 2005/0138110 A1 | 6/2005 | Redlich et al. |
| 2007/0028277 A1 * | 2/2007 | Clemente et al. ............. 725/105 |
| 2007/0064974 A1 * | 3/2007 | Ayachitula et al. ........... 382/103 |
| 2007/0239844 A1 | 10/2007 | Yokoyama et al. |
| 2008/0294641 A1 * | 11/2008 | Kim ................................. 707/9 |

FOREIGN PATENT DOCUMENTS

| | | |
|---|---|---|
| EP | 1 311 124 A1 | 5/2003 |
| EP | 1 729 242 A1 | 12/2006 |
| WO | WO 2008/004578 A1 | 1/2008 |
| WO | WO 2008/078624 A1 | 7/2008 |

OTHER PUBLICATIONS

International Search Report and Written Opinion for International Application No. PCT/IB2009/055320 completed Apr. 13, 2010, and mailed on Apr. 29, 2010.
Pfitzmann, Multi-layer Audit of Access Rights, IBM Zurich Research Lab, Rüschlikon, Switzerland, http://www.springerlink.com/content_24375417r7086101, p. 18-32, © Springer-Verlag Berlin Heidelberg, 2007.
Communication from the European Patent Office for European Patent Application No. 09793583.7 dated May 25, 2012.

* cited by examiner

*Primary Examiner* — Gregory F Cunningham
(74) *Attorney, Agent, or Firm* — Alston & Bird LLP

(57) ABSTRACT

A user interface for masking portions of an image is provided. A controller included in the user interface is arranged for receiving a request for an image, determining whether access settings associated with selected portions of the image are fulfilled, and providing image data representing said image in response to determining that the access settings are fulfilled.

22 Claims, 6 Drawing Sheets

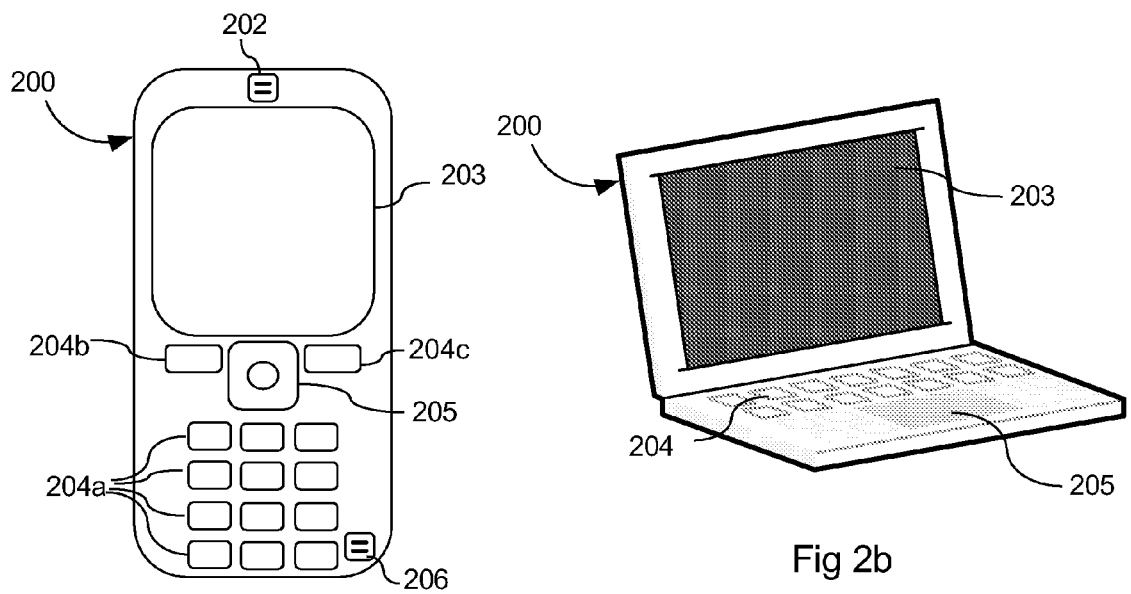
Fig 2a
Fig 2b
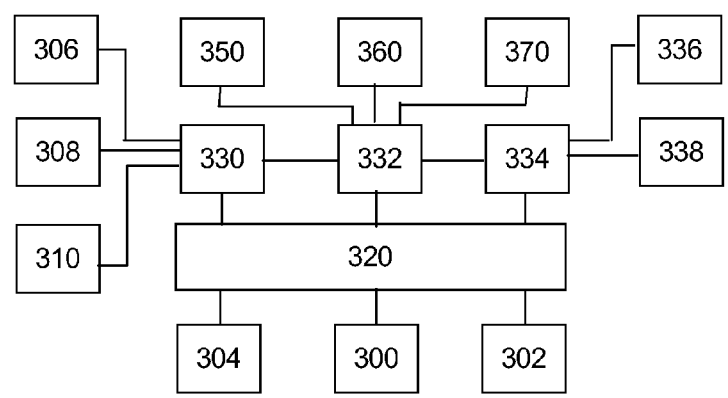
Fig 3

METHODS, APPARATUSES, AND COMPUTER PROGRAM PRODUCTS FOR MAINTAINING OF SECURITY AND INTEGRITY OF IMAGE DATA

FIELD

The present application relates to a user interface, a device and a method for improved maintaining integrity, and in particular, to a user interface, a device and a method for improved maintaining of integrity for image sharing.

BACKGROUND

More and more electronic devices such as mobile phones, MP3 players, Personal Digital Assistants (PDAs) and computers both laptops and desktops are being used to browse the internet and to upload and share images via applications that make these images available on the internet. These applications generally make these images available to a large number of persons, much larger than is known to the user uploading these images. Some images may contain data or other information that may be regarded as sensitive and is not something that the user would like everyone to see as it would seriously infringe on either the uploader or an acquaintance of the uploader's personal integrity or even security.

Some applications offer the user an opportunity to restrict access to the images to certain groups or persons. This has a disadvantage in that the restrictions become very limited and are not flexible and are usually applied to a whole series of images instead of a single image. This requires that the user carefully selects and arrange his images in albums which are assigned a certain security level or access rights criteria. This makes it further difficult for a user browsing these images as that user has to browse through multiple albums to see all the images they are allowed to access.

A device that allows fast and easy access as well as opportunities to restrict access to images that are to be shared or accessible through the device or user interface would thus be useful in modern day society

SUMMARY

On this background, it would be advantageous to provide a user interface, an apparatus and a method that overcomes or at least reduces the drawbacks indicated above by providing an apparatus according to the claims.

Further objects, features, advantages and properties of device, method and computer readable medium according to the present application will become apparent from the detailed description.

BRIEF DESCRIPTION OF THE DRAWINGS

In the following detailed portion of the present description, the teachings of the present application will be explained in more detail with reference to the example embodiments shown in the drawings, in which:

FIGS. 2a and b are each views of an apparatus according to an embodiment;

FIG. 3 is a block diagram illustrating the general architecture of an apparatus of FIG. 2a in accordance with the present application;

DETAILED DESCRIPTION

In the following detailed description, the user interface, the device, the method and the software product according to the teachings for this application in the form of a cellular/mobile phone will be described by the embodiments. It should be noted that although only a mobile phone is described the teachings of this application can also be used in any electronic device such as in portable electronic devices such as laptops, PDAs, mobile communication terminals, electronic books and notepads and other electronic devices offering access to information.

Figure 1:
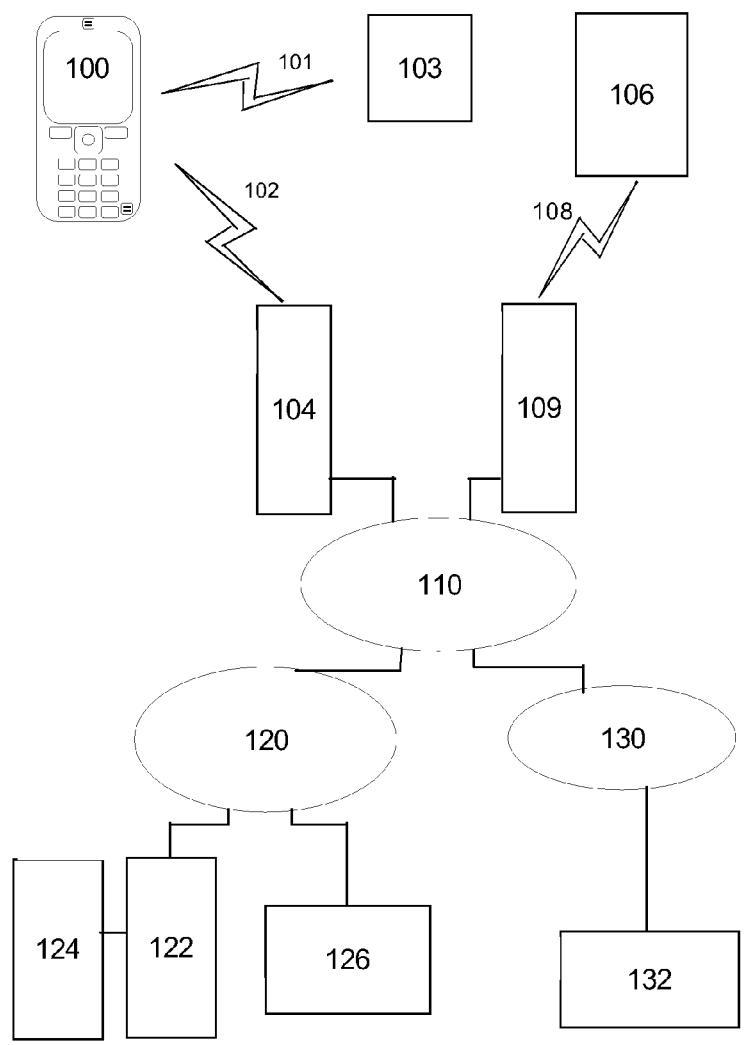
FIG. 1 is an overview of a telecommunications system in which a device according to the present application is used according to an embodiment.

FIG. 1 illustrates an example of a cellular telecommunications system in which the teachings of the present application may be applied. In the telecommunication system of FIG. 1, various telecommunications services such as cellular voice calls, www or Wireless Application Protocol (WAP) browsing, cellular video calls, data calls, facsimile transmissions, music transmissions, still image transmissions, video transmissions, electronic message transmissions and electronic commerce may be performed between a mobile terminal 100 according to the teachings of the present application and other devices, such as another mobile terminal 106 or a stationary telephone 132. It is to be noted that for different embodiments of the mobile terminal 100 and in different situations, different ones of the telecommunications services referred to above may or may not be available; the teachings of the present application are not limited to any particular set of services in this respect.

The mobile terminals 100, 106 are connected to a mobile telecommunications network 110 through Radio Frequency (RF) links 102, 108 via base stations 104, 109. The mobile telecommunications network 110 may be in compliance with any commercially available mobile telecommunications standard, such as Group Spéciale Mobile (GSM), Universal Mobile Telecommunications System (UMTS), Digital Advanced Mobile Phone system (D-AMPS), The code division multiple access standards (CDMA and CDMA2000), Freedom Of Mobile Access (FOMA), and Time Division-Synchronous Code Division Multiple Access (TD-SCDMA).

The mobile telecommunications network 110 is operatively connected to a wide area network 120, which may be Internet or a part thereof. An Internet server 122 has a data storage 124 and is connected to the wide area network 120, as is an Internet client computer 126. The server 122 may host a www/wap server capable of serving www/wap content to the mobile terminal 100.

A public switched telephone network (PSTN) 130 is connected to the mobile telecommunications network 110 as is commonly known by a skilled person. Various telephone terminals, including the stationary telephone 132, are connected to the PSTN 130.

The mobile terminal 100 is also capable of communicating locally via a local link 101 to one or more local devices 103.

The local link can be any type of link with a limited range, such as Bluetooth, a Universal Serial Bus (USB) link, a Wireless Universal Serial Bus (WUSB) link, an IEEE 802.11 wireless local area network link, a Radio Standard link for example an RS-232 serial link, etc. The local devices 103 can for example be various sensors that can communicate measurement values to the mobile terminal 100 over the local link 101.

A computer such as a laptop or desktop can also be connected to the network both via a radio link such as a WiFi link, which is the popular term for a radio frequency connection using the WLAN (Wireless Local Area Network) standard IEEE 802.11.

It should be noted that the teachings of this application are also capable of being utilized in an internet network of which the telecommunications network described above may be a part of.

As is commonly known the internet is a global system of interconnected computer networks that interchange data by packet switching using the standardized Internet Protocol Suite (TCP/IP). It is a "network of networks" that consists of millions of private and public, academic, business, and government networks of local to global scope that are linked by copper wires, fiber-optic cables, wireless connections, and other technologies.

The Internet carries various information resources and services, such as electronic mail, online chat, online gaming, file transfer and file sharing, and the inter-linked hypertext documents and other resources of the World Wide Web (WWW).

It should be noted that even though the teachings herein are described solely to wireless networks it is in no respect to be limited to wireless networks as such, but it to be understood to be usable in the Internet or similar networks.

It should thus be understood that an apparatus according to the teachings herein may be a mobile communications terminal, such as a mobile telephone, a personal digital assistant, a laptop as well as a stationary device such as a desktop computer or a server. The apparatus can also be a digital camera having communicative means. Such communicative means can be a serial connection through which it is capable of communicating with another device such as a computer.

An embodiment 200 of the mobile terminal 100 is illustrated in more detail in FIG. 2a. The mobile terminal 200 comprises a speaker or earphone 202, a microphone 206, a main or first display 203 and a set of keys 204 which may include a keypad 204a of common ITU-T type (alpha-numerical keypad representing characters "0"-"9", "*" and "#") and certain other keys such as soft keys 204b, 204c and a joystick 205 or other type of navigational input device.

An alternative embodiment of the teachings herein is illustrated in FIG. 2b in the form of a computer which in this example is a laptop computer 200. The laptop computer has a screen 203, a keypad 204 and navigational means in the form of a cursor controlling input means which in this example is a touchpad 205.

It should be noted that a computer can also be connected to a wireless network as shown in FIG. 1 where the computer 200 would be an embodiment of the device 100.

The internal component, software and protocol structure of the mobile terminal 200 will now be described with reference to FIG. 3. The mobile terminal has a controller 300 which is responsible for the overall operation of the mobile terminal and may be implemented by any commercially available CPU ("Central Processing Unit"), DSP ("Digital Signal Processor") or any other electronic programmable logic device. The controller 300 has associated electronic memory 302 such as Random Access Memory (RAM), Read Only Memory (ROM), Electrically Erasable Programmable Read-Only Memory (EEPROM), flash memory, or any combination thereof. The memory 302 is used for various purposes by the controller 300, one of them being for storing data used by and program instructions for various software in the mobile terminal. The software includes a real-time operating system 320, drivers for a man-machine interface (MMI) 334, an application handler 332 as well as various applications. The applications can include a message text editor 350, a notepad application 360, as well as various other applications 370, such as applications for voice calling, video calling, sending and receiving messages such as Short Message Service (SMS), Multimedia Message Service (MMS) or email, web browsing, an instant messaging application, a phone book application, a calendar application, a control panel application, a camera application, one or more video games, etc. It should be noted that two or more of the applications listed above may be executed as the same application.

The MMI 334 also includes one or more hardware controllers, which together with the MMI drivers cooperate with the first display 336/203, and the keypad 338/204 as well as various other Input/Output devices such as microphone, speaker, vibrator, ringtone generator, LED indicator, etc.

The software also includes various modules, protocol stacks, drivers, etc., which are commonly designated as 330 and which provide communication services (such as transport, network and connectivity) for an RF interface 306, and optionally a Bluetooth interface 308 and/or an IrDA interface 310 for local connectivity. The RF interface 306 comprises an internal or external antenna as well as appropriate radio circuitry for establishing and maintaining a wireless link to a base station (e.g. the link 102 and base station 104 in FIG. 1). As is well known to a man skilled in the art, the radio circuitry comprises a series of analogue and digital electronic components, together forming a radio receiver and transmitter. These components include, band pass filters, amplifiers, mixers, local oscillators, low pass filters, Analog to Digital and Digital to Analog (AD/DA) converters, etc.

The mobile terminal also has a Subscriber Identity Module (SIM) card 304 and an associated reader. As is commonly known, the SIM card 304 comprises a processor as well as local work and data memory.

FIG. 4 show a screen shot view of an apparatus 400 according to the teachings herein. It should be noted that such an apparatus is not limited to a mobile phone, but can be any apparatus capable of being connected to a network. In particular such an apparatus is capable of being connected to a network for either uploading or downloading images or both such as a computer, a personal digital assistant or a browser device.

In one embodiment the screen shot view is a view of an application window. It should be understood that the choice of the size of the screen or the application window is dependant on a number of design issues such as total device size, purpose of the application as well as user preference.

Figure 4A:
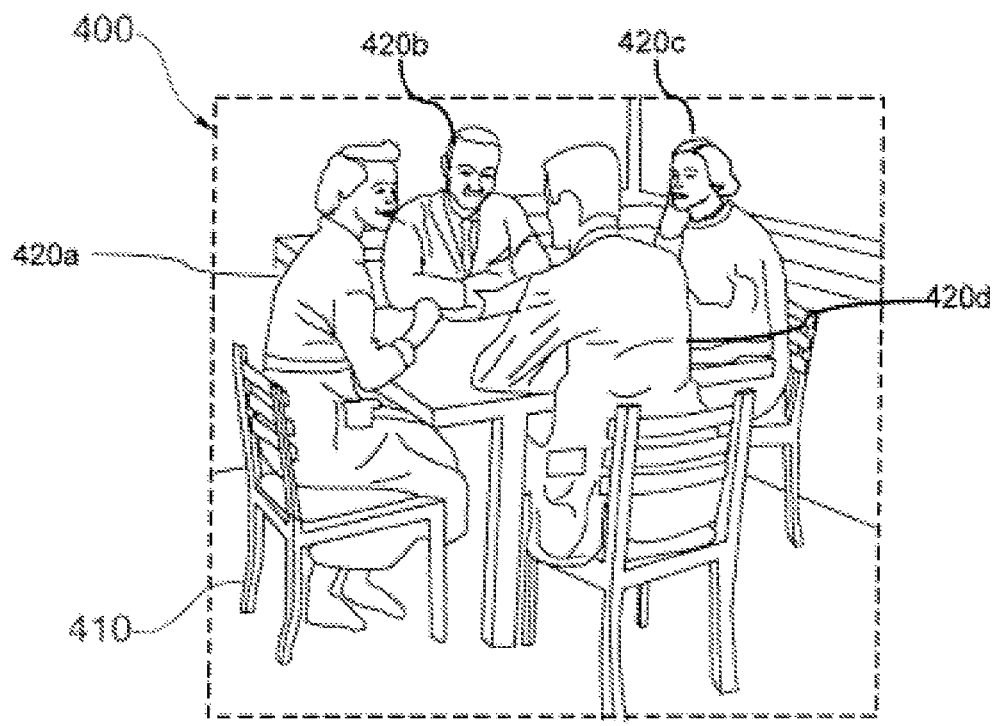
FIGS. 4a, b, c, and d are screen shot views of an apparatus or views of an application window according to an embodiment.

In this embodiment an image 410 is displayed, see FIG. 4a. In one embodiment the image is about to be uploaded to a server by a user and in one alternative embodiment the image has already been uploaded to a server. In one embodiment the server is also operating as a client in a network.

A group of four persons 420a-d is shown on the image 410. One of the persons 420a has expressed wishes to not be publicly shown as being part of the group. The reasons for this wish can be any of a great number of possibilities all relating to personal integrity issues or even security issues and the reasons for this wish will not be discussed further herein.

A controller is arranged to receive a selection of at least a portion of the image data and to assign an access criterion to that portion.

Figure 4B:
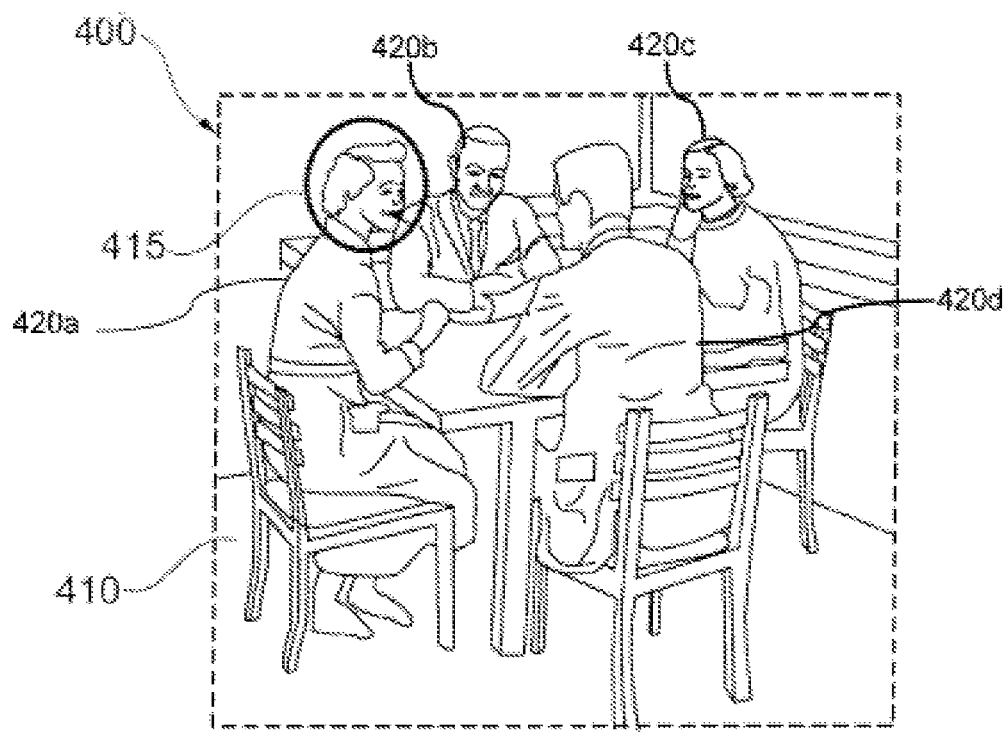

In FIG. 4b a user has made a selection of a portion 415 of the image 410. In this example the portion 415 overlaps with the face of person 420a.

In this embodiment the selection is marked by a circle being displayed around the selection 415.

In one embodiment the selection is made by marking the portion using a pointing tool such as a cursor controlled by a mouse or navigation buttons or if a touch display is used by a stylus.

In one embodiment the selection is made using a lasso tool as is known from computer software such as Adobe Photoshop®.

In one embodiment the selection is made by marking the center (or other position) of a selection mask. Upon marking the center a portion of the image surrounding this marked center is then selected.

Figure 4C:
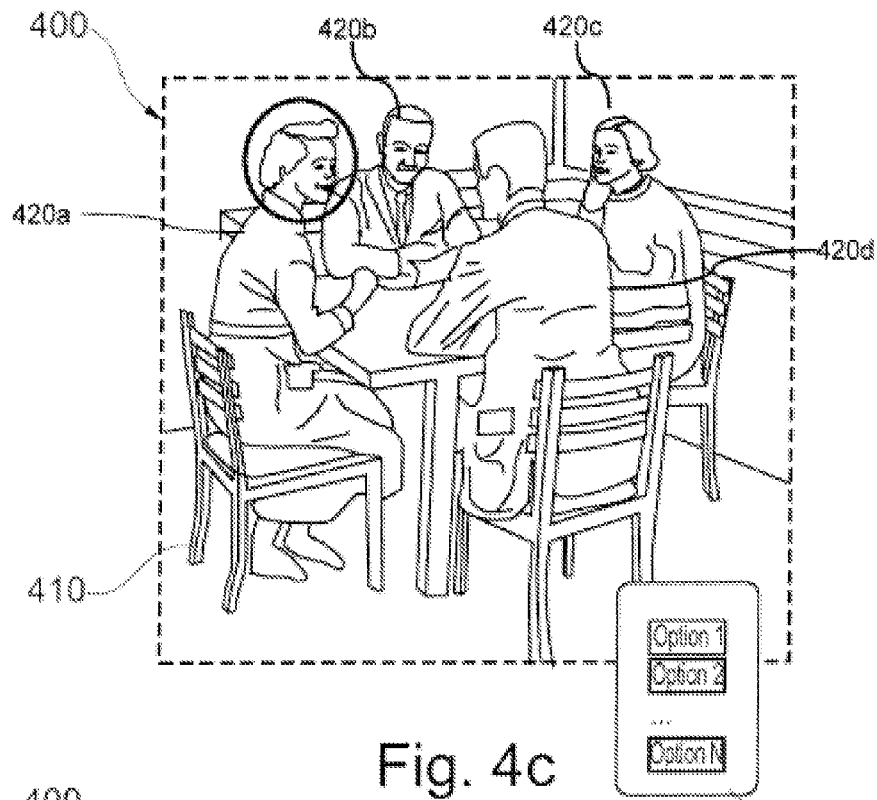

In one embodiment a controller (not shown) is arranged to display a pop-up window or pop-up box 430 that provides a user with access right options, see FIG. 4c. In this example a list of N options are displayed and a user has marked one option (Option 2) for selection.

In one embodiment the options correspond to levels of security or integrity. A higher level gives access to fewer persons or groups than a lower level.

In one embodiment the options correspond to users. In such an embodiment the option list is a list of friends or other contacts.

In one embodiment the options correspond to groups or networks of persons. Example of such groups can be friends, colleagues, friends of friends etc. and depend on the capabilities of the application handling the images. For example, in one embodiment all client devices associated with a given network domain name may be a group.

In one embodiment a controller (not shown) is arranged to provide user with means to create new options as needed. Consequently, user may define a default list of options comprising the options he/she typically uses.

In one embodiment the access setting options are inclusive, i.e. they comprise a list of persons or groups that have access to the selected portion.

In one embodiment the access setting options are exclusive, i.e. they comprise a list of persons or groups that do not have access to the selected portion.

In one embodiment the access setting can be set so that no-one except the owner has access to the selected portion.

In one embodiment the options correspond to a specified password that a viewer will be prompted to input to view the selected portion 415. Selecting a password will cause the controller to display an input field for the password to be given. In one embodiment the password has been given before hand and need not be given again or it will only be displayed for user confirmation.

It should be noted that in one embodiment the access rights options are set to a default value which can be set by a user. Such default values can be set for an album, for a user or for a device. This allows a user to specify access rights that are to be used for all selections made in a series of images.

In one embodiment the access rights settings shown in the pop-up box 430 is a series of default values of which the user can select one or more that are appropriate.

In one embodiment the controller is arranged to display the options in a list adjacent the image or in a separate application window or field (not shown).

In one embodiment the controller is arranged to store the access settings for the image 410 along with the image or alternatively in a package comprising both the image data and the access settings.

The controller is also arranged to upload these access settings along with the image data or alternatively separately. The latter is especially useful if the image data has already been uploaded.

Also, in one embodiment the actual image database and access settings database may be logically separated (with some implementations these databases may be physically separated as well). In such an embodiment the controller is arranged to store/upload the image data and access settings separately.

It should be noted that multiple selections can be made for one image and each selected portion may have its own access setting or they may be common to the image.

Figure 4D:
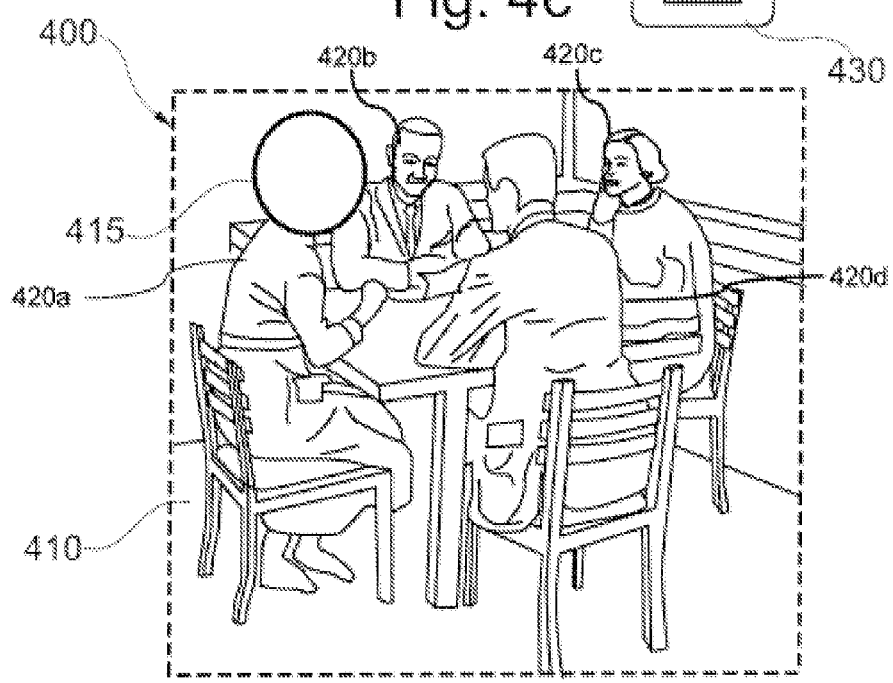

FIG. 4d shows a screen shot view of the image as it will be displayed to a person lacking the access right to view the selected portion 415 of the image 410.

FIG. 5 shows a display view 503 or alternatively an application window 503 on an apparatus. In this example an image 510 is displayed.

In the exemplary description steps that might be displayed are still shown and described to fully explain the procedure or method performed. Which steps that are actually displayed depend on the implementation and the options chosen by both the user and the designer.

Figure 5A:
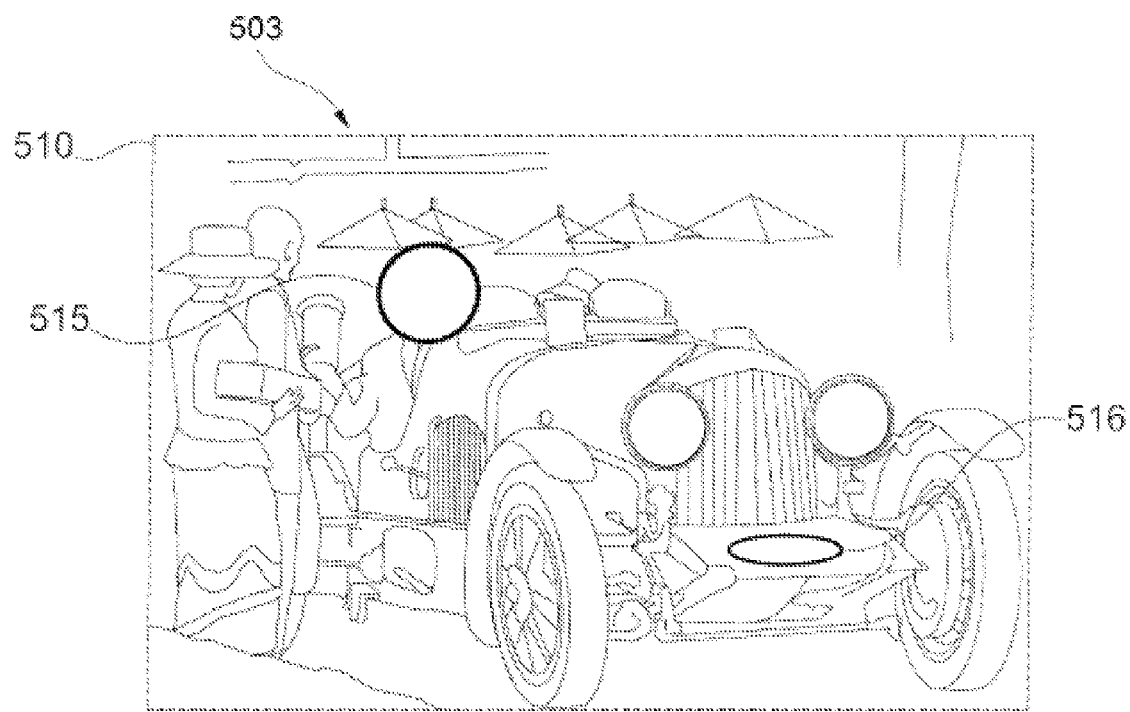
FIGS. 5a and b are screen shot views of an apparatus or views of an application window according to an embodiment.

In FIG. 5a an image is displayed with two masked portions 515 and 516. One being the driver's face (515) and the other being the registration number (516). In this embodiment the masking is achieved by completely whitening out the portions 515 and 516.

In other embodiments other maskings may be used such as blurring, blacking out, partial blacking out, inverting colors, stripings etc., textures such as image sharing service's logo etc. In some embodiments user may be given possibility to select which masking is used.

A controller is arranged to check the access settings in relation the user requesting the image and if it is determined that the user is allowed to view the masked portion 515 the image is displayed without the masking.

In one embodiment the image data is downloaded along with the access settings and the determination is performed locally.

In one embodiment the request for the image is uploaded along with a user identification and a controller determines whether the user identification correspond to the access setting. Image data corresponding to the user identification's correspondence with the access setting is then downloaded to the requestor.

In one embodiment the user identification is requested upon determination that the image is associated to an access setting. In one embodiment the user identification is the password.

In this example the two portions 515 and 516 have different access settings and the user identification provided is only determined to satisfy or correspond to one of the access settings.

Figure 5B:
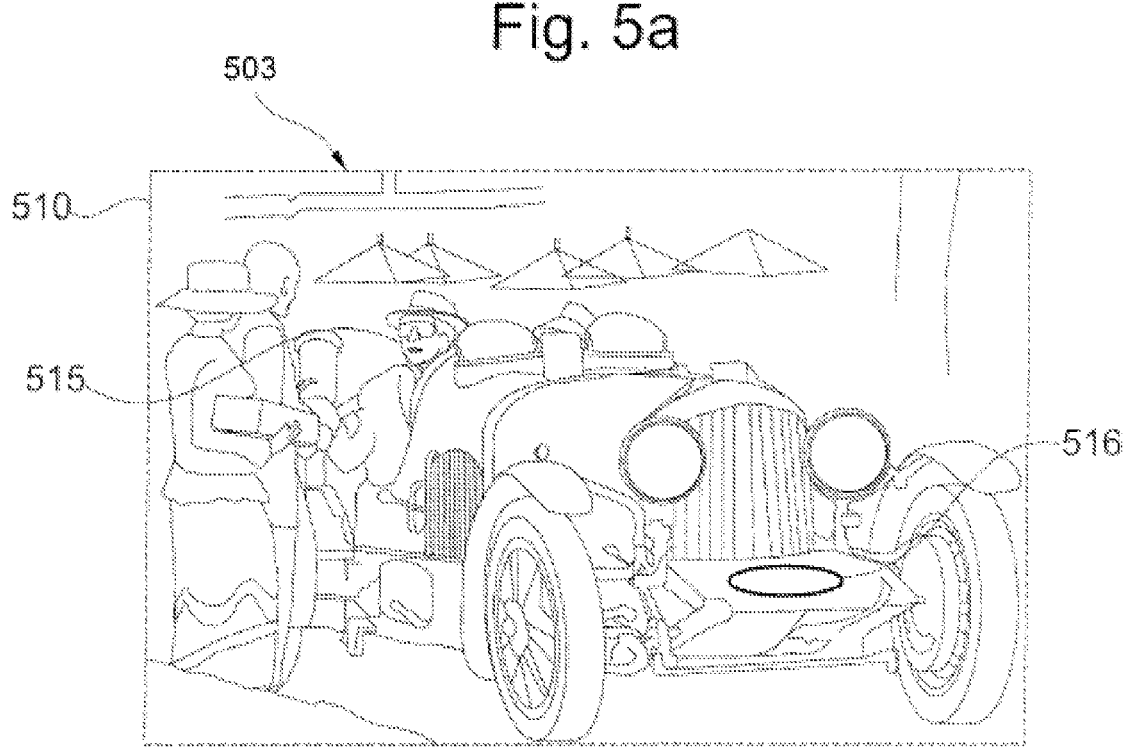

FIG. 5b shows the image 510 being displayed with one of the portions 516 still being masked and the other portion 515 being displayed unmasked. In this image the face of the driver is thus visible, but the registration number is still masked.

Figure 6:
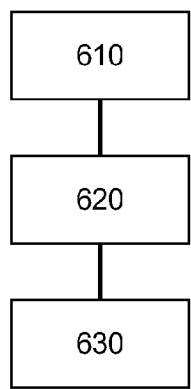
FIG. 6 is a flow chart describing a method according to an embodiment of the application.

FIG. 6 shows a flow chart of a method according to the teachings herein. In a first step 610 a selection of a portion is received. A controller is arranged to determine access settings corresponding to the selected portion in step 620 and to store or upload these access settings in step 630.

Figure 7:
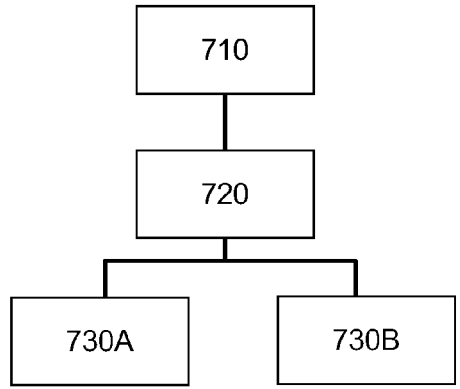
FIG. 7 is a flow chart describing a method according to an embodiment of the application.

FIG. 7 shows a flow chart of a method according to the teachings herein. In a first step 710 a request for an image is received. In a second step 720 a controller is arranged to determine whether access settings corresponding to a portion of the image is fulfilled or satisfied. If so the controller is arranged to provide image data corresponding to an image with the portion visible and in step 730A. If not the controller is arranged to provide image data corresponding to an image with the portion masked in step 730B.

In one embodiment the access settings are inclusive, e.g. they comprise a list of persons or groups that have access to the selected portion.

In one embodiment the access settings are exclusive, e.g. they comprise a list of persons or groups that do not have access to the selected portion.

In one embodiment the access settings are dynamic. In one embodiment a controller is arranged to receive instructions indicating that the access settings should be changed.

In one embodiment a user viewing an image may input a request to propose a change to the access settings by suggesting that a person or group should either be included or excluded from having access to the selected portion.

In one embodiment the owner of the image decides whether to update the access settings or not. In one embodiment the user is provided with a notification that such an access setting changing request has been received and the user is prompted to decide whether to allow it or not.

In one embodiment the request is to be voted upon and each user viewing the image and having access to a selected portion is provided with a notification of the pending access setting changing request and a prompt whether to vote in favor or not of the change. Such a vote can either be partial or complete.

In one embodiment all users having access to a selected portion are notified of a pending request regardless of whether they are viewing or have viewed the corresponding image. Such a notification can be given either by a sent message or upon a notification next time the application is started.

Figure 8:
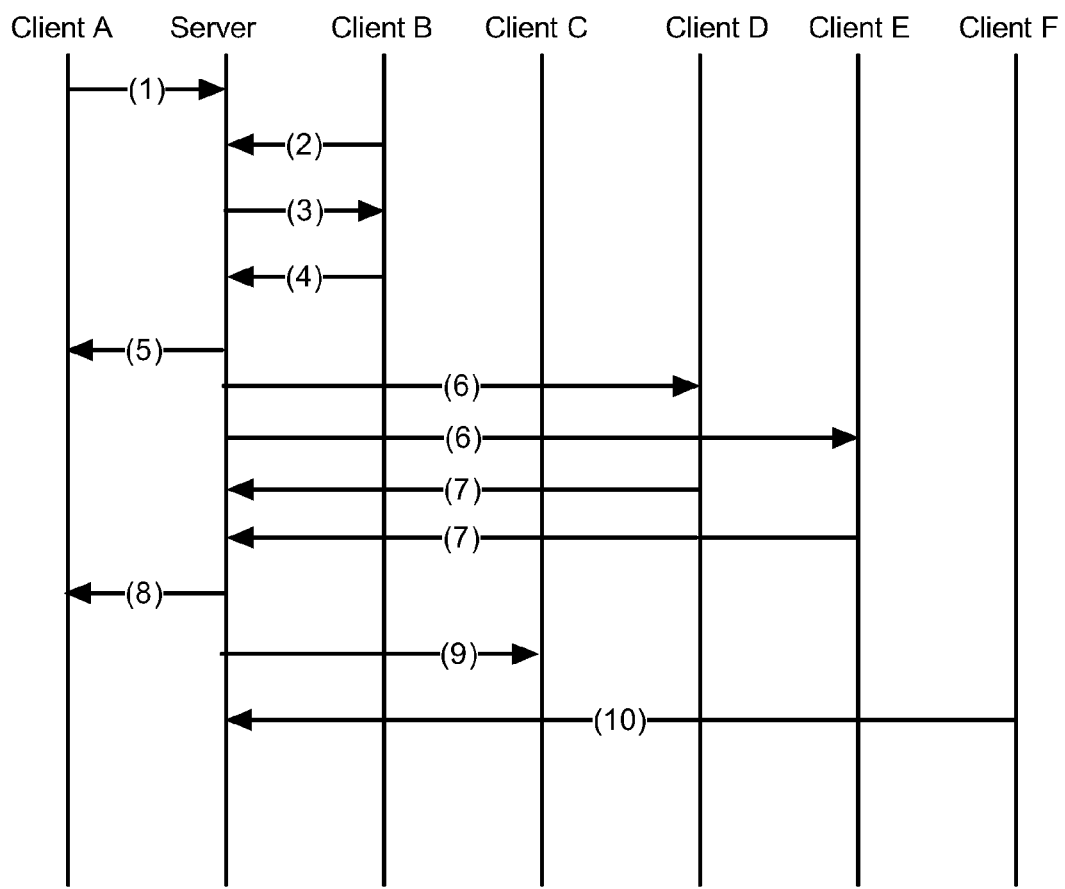
FIG. 8 is a schematic view of communication between a server and a plurality of clients according to an embodiment of the application.

FIG. 8 shows a schematic view of a server and several clients acting and cooperating according to an embodiment. It should be noted that client A and the server may be implemented by the same apparatus.

A client A shares an image having access settings associated with a selected portion of the image by uploading it to a server (1). The server is later requested by a client B to view the image (2). Client B satisfies the access settings and is thus provided with a copy of the image and a view of the access settings (3). Client B sends a request to change the access settings by including a further user, Client C (4). The owner, client A is thereby notified about the request (5) and so are the other users satisfying the access settings (6). The other users vote (7) and the access settings are updated accordingly and the owner is notified accordingly (8). Alternatively the added client C is also notified (9). As can be seen Client F not having any access rights is left out of the communications sent between the server and the other clients.

Client F is notified of his access rights first when he sends his own request (10).

It should be noted that the apparatuses described above may act as a server in a network, as a client in a network or both.

The various aspects of what is described above can be used alone or in various combinations. The teaching of this application may be implemented by a combination of hardware and software, but can also be implemented in hardware or software. The teaching of this application can also be embodied as computer readable code on a computer readable medium. It should be noted that the teaching of this application is not limited to the use in mobile communication terminals such as mobile phones, but can be equally well applied in Personal digital Assistants (PDAs), game consoles, media players, personal organizers, computers or any other device designed for sharing and viewing images.

The teaching of the present application has numerous advantages. Different embodiments or implementations may yield one or more of the following advantages. It should be noted that this is not an exhaustive list and there may be other advantages which are not described herein. For example, one advantage of the teaching of this application is that a user's or other person's integrity can be maintained while allowing greater flexibility of sharing images.

Although the teaching of the present application has been described in detail for purpose of illustration, it is understood that such detail is solely for that purpose, and variations can be made therein by those skilled in the art without departing from the scope of the teaching of this application.

For example, although the teaching of the present application has been described in terms of a mobile phone and a laptop computer, it should be appreciated that the teachings of the present application may also be applied to other types of electronic devices, such as media players, palmtop, laptop and desktop computers and the like. It should also be noted that there are many alternative ways of implementing the methods and apparatuses of the teachings of the present application.

Features described in the preceding description may be used in combinations other than the combinations explicitly described.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The term "comprising" as used in the claims does not exclude other elements or steps. The term "a" or "an" as used in the claims does not exclude a plurality. A unit or other means may fulfill the functions of several units or means recited in the claims.

The invention claimed is:

1. An apparatus comprising at least one processor and at least one memory storing computer program code, wherein the at least one memory and stored computer program code are configured, with the at least one processor, to cause the apparatus to at least:
   receive a request for an image;
   determine whether access settings associated with selected portions of said image are fulfilled;
   cause image data representing said image to be provided in response thereto;
   receive, from a user other than an owner of the image, a request to change the access settings associated with the image; and
   cause the owner of the image to be prompted to change the access settings of the image in response to receiving the request to change the access settings.

2. An apparatus according to claim 1 wherein said request comprises user identification and wherein said determination is based on said user identification.

3. An apparatus according to claim 1 wherein said image data comprises information on masked portions of the image.

4. An apparatus according to claim 1 wherein said image data represents said image with masked portions.

5. An apparatus according to claim 1 wherein said controller is further arranged to request said access settings.

6. An apparatus comprising at least one processor and at least one memory storing computer program code, wherein the at least one memory and stored computer program code are configured, with the at least one processor, to cause the apparatus to at least:
receive, from a user other than an owner of the image, a request to change the access settings of an image, the suggestion indicating at least a portion of the image and suggested access settings for the at least a portion;
cause the owner of the image to be prompted to change the access settings in response to receiving the request to change the access settings; and
receive an indication from the owner to adopt the requested access settings.

7. An apparatus according to claim 6 wherein said controller is further arranged to associate said suggested access settings with said image and to store said access settings.

8. An apparatus according to claim 6 wherein said controller is further arranged to upload said suggested access settings.

9. An apparatus according to claim 1 wherein said apparatus is a server or a client or both.

10. A computer program product comprising at least one non-transitory computer-readable storage medium having computer-readable program instructions stored therein, the computer-readable program instructions comprising:
program instructions configured to receive, from a user other than an owner of an image, a request to change the access settings of the image, the request indicating at least a portion of the image and suggested access settings for the at least a portion;
program instructions configured to cause the owner of the image to be prompted to change the access settings in response to receiving the request to change the access settings; and
program instructions configured to receive an indication from the owner to adopt the suggested access settings.

11. A computer program product comprising at least one non-transitory computer-readable storage medium having computer-readable program instructions stored therein, the computer-readable program instructions comprising:
program instructions configured to receive a request for an image;
program instructions configured to determine whether access settings associated with selected portions of said image are fulfilled;
program instructions configured to cause image data representing said image to be provided in response thereto;
program instructions configured to receive, from a user other than an owner of the image,
a request to change the access settings associated with the image; and
program instructions configured to cause the owner of the image to be prompted to change the access settings of the image in response to receiving the request to change the access settings.

12. An apparatus incorporating and implementing a computer readable medium according to claim 10.

13. A method comprising:
receiving a request for an image;
determining, using a processor, whether access settings associated with selected portions of said image are fulfilled;
causing image data representing said image to be provided in response thereto;
receiving, from a user other than an owner of the image, a request to change the access settings associated with the image; and
causing the owner of the image to be prompted to change the access settings of the image in response to receiving the request to change the access settings.

14. A method according to claim 13, wherein said request comprises user identification and wherein said determination is based on said user identification.

15. A method according to claim 13, wherein said image data comprise information on masked portions of the image.

16. A method according to claim 13, wherein said image data represents said image with masked portions.

17. A method according to claim 13, further comprising requesting said access settings.

18. A method comprising:
receiving, from a user other than an owner of an image, a request to change the access settings of an image, the request to change the access settings indicating at least a portion of the image and suggested access settings for the at least a portion;
causing, using a processor, the owner of the image to be prompted to change the access settings in response to receiving the request; and
receiving an indication from the owner to adopt the suggested access settings.

19. A method according to claim 18, further comprising associating said suggested access settings with said image and storing said access settings.

20. A method according to claim 18, further comprising uploading said suggested access settings.

21. An apparatus according to claim 6 wherein said apparatus is a server or a client or both.

22. An apparatus incorporating and implementing a computer readable medium according to claim 11.

* * * * *